United States Patent [19]

Allen et al.

[11] Patent Number: 4,710,206

[45] Date of Patent: Dec. 1, 1987

[54] ATMOSPHERE CONTROLLING PROCESS FOR FOOD STORAGE

[76] Inventors: Ronald C. Allen, 654 Geneva St., St. Catherines, Ontario, Canada, L2N 2J8; Eugene V. Sajur, 49 Arthur St., St. Catharines, Ontario, Canada, L2M 1H1

[21] Appl. No.: 883,041

[22] Filed: Jul. 7, 1986

[51] Int. Cl.4 ............................................. B01D 53/04
[52] U.S. Cl. .......................................... 55/58; 55/74; 55/179; 55/189; 55/387; 426/419
[58] Field of Search ............... 55/58, 59, 62, 74, 179, 55/387; 426/312, 314, 419

[56] References Cited

U.S. PATENT DOCUMENTS 3,203,771  8/1965  Brown et al. ................. 55/59 X
3,313,630  4/1967  Harvey, Jr. .................. 426/419 X
3,445,194  5/1969  Thomas et al. ............... 426/419 X
3,740,928  6/1973  Schmid .......................... 55/179
4,228,197  10/1980  Means ............................ 55/59 X

FOREIGN PATENT DOCUMENTS 794298   9/1968  Canada .
1128810  8/1982  Canada .
2922145  3/1980  Fed. Rep. of Germany ......... 55/58

Primary Examiner—Robert Spitzer
Attorney, Agent, or Firm—McConnell and Fox

[57] ABSTRACT

In a controlled atmosphere storage system the activated charcoal scrubber chamber is partially evacuated before and/or after transfer from scrubbing to re-activation thus reducing the amount of ambient air introduced into the system.

5 Claims, 5 Drawing Figures

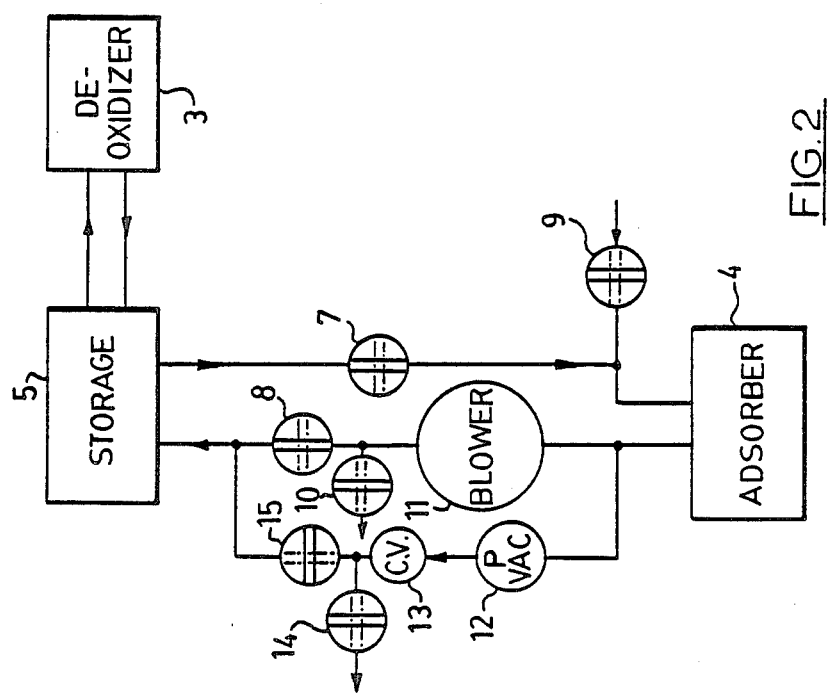
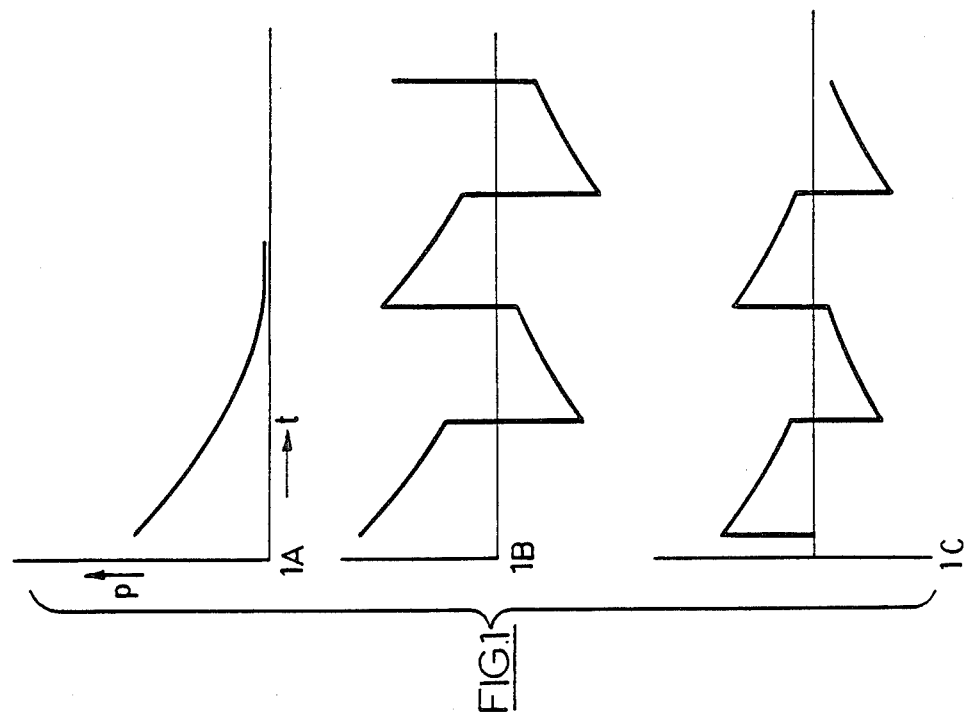

ATMOSPHERE CONTROLLING PROCESS FOR FOOD STORAGE

BACKGROUND OF THE INVENTION

It is well known that perishable or oxidizable foods may be preserved by controlling the oxygen and carbon dioxide content of the atmosphere in which the food is stored and that quality of stored foods may be improved by removal of other odours and gases from that atmosphere.

1. Field of the Invention

This invention has particular application to food storage systems which reduce the oxygen content of the gas within the storage system by combining the oxygen with a hydrocarbon gas and subsequently removing the carbon dioxide by passing the storage gas over a charcoal adsorber.

2. Description of the Prior Art

Canadian Pat. No. 794,298 issued in 1968 describes a process for treating the storage gas by passing it through a combustor, that is a catalytic devise for combining the oxygen with a hydrocarbon gas, and for further treating the storage gas by passing it through an adsorber consisting of activated charcoal. For continued processing, it is necessary that the activated charcoal adsorber be regenerated by passing atmospheric air through the adsorber to remove the carbon dioxide. Canadian Pat. No. 1,128,810 issued Aug. 3rd, 1982 discloses a process for avoiding the introduction of atmospheric air from the adsorber when the adsorber is once more connected to the food storage chamber after regeneration. In the process described in this patent, the adsorber chamber is refilled with gas from the storage chamber and the atmospheric air is displaced from the adsorber chamber into the atmosphere before the adsorber chamber is reconnected to the storage chamber. It will be noted that because the storage chamber is sealed and the gas in the adsorber chamber is displaced by gas from the storage chamber, the volume of gas thus displaced must be extracted from the storage chamber. This must of necessity cause a reduction of pressure in the storage chamber. Subsequently, when the adsorber chamber is to be reconnected to atmosphere, atmospheric air is introduced into the adsorber chamber and the gas from the adsorber chamber is reintroduced into the storage chamber. Here, once again, a variation in pressure in the storage chamber must be produced. It will be seen therefore that variations in the pressure in the storage chamber must be caused by this mode of operation. Such variations in pressure clearly must encourage leakage into the storage chamber. Since the storage chamber is a large chamber and, in many cases, is merely a modified refrigeration chamber, which must permit introduction and removal of food from the chamber, the chamber cannot be perfectly sealed and any variation in pressure within the chamber with reference to the ambient atmospheric pressure will produce undesirable leakage and introduction of oxygen from the ambient atmosphere.

SUMMARY OF THE INVENTION

In accordance with the present invention, an improved food storage controlled atmosphere system is provided in which the variations of pressure within the sealed storage chamber are reduced and yet the re-introduction of atmospheric air with its undesirable oxygen content into the storage chamber during the re-activation of the adsorber is minimized. In addition, the system is operated in such a manner as to increase the efficiency of operation of the adsorber.

Briefly, these objectives are obtained by passing the storage chamber gas through the adsorber chamber until such time as the activated carbon contains a substantial quantity of carbon dioxide. The inlet from the storage chamber to the adsorber is then closed and gas is continued to be abstracted from the adsorber chamber and forced into the storage chamber until the pressure is substantially reduced in the adsorber chamber. The outlet from the adsorber chamber to the storage chamber is now closed. The inlet from atmosphere to the adsorber chamber is opened to permit atmospheric air to flood the adsorber chamber. The outlet from the adsorber chamber is now opened to atmosphere and the gases in the adsorber chamber are flushed out. The inlet from atmosphere to the adsorber chamber is now closed and the pressure in the adsorber chamber is substantially reduced by extracting the gas from the adsorber chamber and passing it to the ambient atmosphere. The outlet from the adsorber chamber to ambient atmosphere is now closed and the inlet from the storage chamber to the adsorber chamber is re-opened. The outlet from the adsorber chamber is once more opened to the storage chamber and gas is once more passed from the storage chamber through the adsorber chamber back to the storage chamber. This cycle is repeated with such frequency and period as to properly control the carbon dioxide level in the storage chamber.

Alternatively, during regeneration, the inlet to the adsorber chamber may be closed from the storage chamber and opened to atmosphere. At the same time the outlet from the adsorber chamber may be closed to the storage chamber and opened to atmosphere and a flow of gas forced through the adsorber for a predetermined period of time. Subsequently the inlet from the ambient atmosphere to the adsorber chamber may be closed. The outlet from the adsorber chamber is continued to be connected to the ambient atmosphere and the pressure in the adsorber chamber reduced. The outlet from the adsorber chamber is then connected to the storage chamber and at the same time the inlet from the storage chamber into the adsorber chamber is re-opened and the gas from the storage chamber is once more passed through the adsorber.

In both of these processes it will be noted that the variations in pressure in the storage chamber are only due to the volume of gas removed from the adsorber chamber during reduction of pressure in the storage chamber. Since this is less than the total volume of gas in the adsorber chamber, the pressure variations in the storage chamber are reduced over those pressure variations caused by the processes disclosed in the prior art, but at the same time, the amount of atmospheric oxygen introduced into the system by regeneration of the adsorber is reduced and the effectiveness of the adsorber is increased by the pressure variations.

A clearer understanding of our invention may be had from a consideration of the following drawings in which:

FIGS. 1A–C are a series of pressure versus time graphs related to the storage chamber.

FIG. 2 is a schematic diagram of the system in accordance with the invention.

Figure 3:
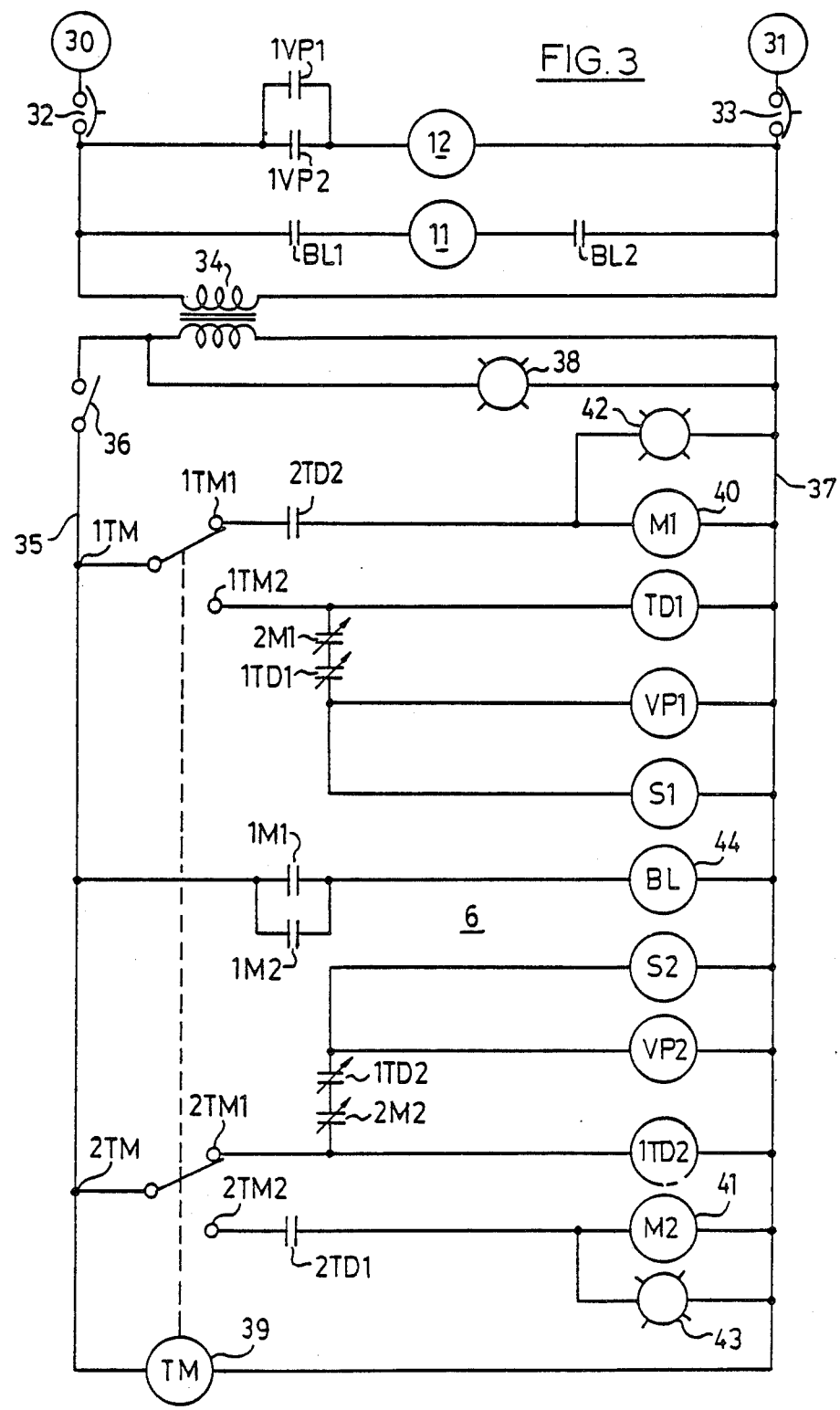
FIG. 3 is a schematic diagram of the electrical control system for the system of FIG. 2.

Considering first FIG. 1, it will be seen that the pressure p, that is the pressure within the storage chamber, when a pressure is maintained within the storage chamber, tends to fall towards the ambient atmospheric pressure, that is the base line of the graph, over the time t in the horizontal direction of the graph at a rate which is a function of the pressure within the chamber, asymptotically approaching the atmospheric pressure. The actual shape of the curve and the rate of reduction of pressure is obviously a function of the leakage of the storage room but it will be evident that with any given storage room the rate of change of pressure will be a function of the leakage of that particular room and, in addition, the change of pressure must represent the amount of atmospheric air introduced into the room due to leakage. It will be evident, therefore, that the rate of change of pressure and the time of duration of the pressure change together will express the volume of atmospheric air introduced into the storage chamber by leakage.

FIGS. 1B and 1C disclose systems where the pressure within the storage chamber is alternately above and below atmospheric, but in 1B the pressure is substantially above and below atmospheric and therefore operating on the portion of the curve of FIG. 1A where the slope is greatest while FIG. 1C illustrates a similar situation where the variation of pressure in the chamber above and below atmospheric is at a lower portion of the curve. It will be clear therefore that the volume of atmospheric air introduced into the storage chamber in the operation illustrated in FIG. 1B is greater than the amount of atmospheric air introduced into the storage chamber in the operation illustrated in FIG. 1C.

Considering now FIG. 2, there is shown a food storage chamber 5 and associated de-oxidizer 3 and an adsorber 4. A plurality of valves 7, 8, 9 and 10 interconnect the adsorber with the food storage chamber or ambient atmosphere, selectively, as controlled by the automatic control system of FIG. 3. Blower 11 produces a flow of gas through the adsorber chamber. A vacuum pump 12 extracts the gas from the adsorber chamber 4 and passes it through check valve 13 and to atmosphere through valve 14 or to the storage chamber 5 through valve 15.

In operation, the system functions as follows: the food is placed in the food storage chamber 5 and the gas in the food storage chamber is de-oxidized by de-oxidizer 3 which may, for example, be a catalytic combustor which consumes the oxygen in the storage chamber gas by combining it with a suitable hydrocarbon such as natural gas. The gas in the food storage chamber therefore becomes oxygen deficient. However, during the operation, the carbon dioxide produced by the de-oxidizer increases the carbon dioxide level in the storage chamber to an unsatisfactory level. In order to reduce the carbon dioxide level in the food storage chamber valves designated 7 and 8 are opened as shown in the diagram and the blower 11 is energized.

Figure 4:
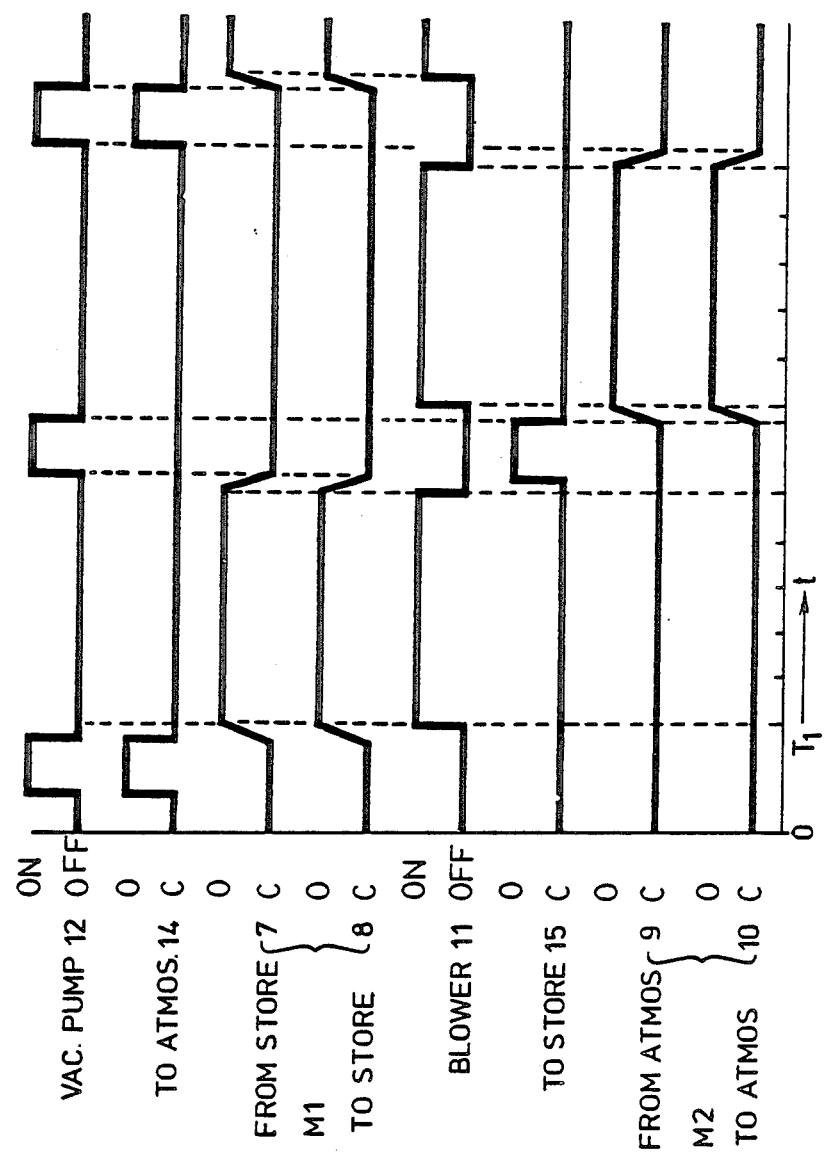
FIG. 4 is a time graph of the operation of the system.

Examining FIG. 4, it will be seen that at time T1, valves 7 and 8 and pump 11 are all in the "on" condition. This condition continues for the time period shown as 5 time units which may, for example, be 5 minutes. Valves 7 and 8 are now closed and blower 11 de-energized. Valve 15 is opened and pump 12 is energized. This condition continues for a further time unit, reducing the pressure in the adsorber chamber to a predetermined value. Valve 15 is now closed and pump 12 is deenergized. After a brief interval, approximately 1/6th of a time element, which may, for example, be 10 seconds, valves 9 and 10 are opened and blower 11 is energized. As soon as valve 9 is opened the atmospheric air enters the adsorber 4. Blower 11 causes the air to continue to flow through the adsorber, removing the carbon dioxide adsorbed by the activated carbon within the adsorber and the air continues to flow through the adsorber and out through valve 10 to the atmosphere. This continues for a period of 5 time elements at which time valves 9 and 10 close, valve 14 opens and pump 12 operates for a time element, at which time valve 14 closes and pump 12 is deenergized. After a further time period, about 1/6th of a time element, for example 10 seconds, valves 7 and 8 are once more opened and blower 11 is once more energized. As soon as valve 7 is opened the gas from the food storage chamber rushes into the adsorber and blower 11 causes the gas from the food storage chamber to continue to pass through the adsorber for a predetermined period of time and the whole cycle is repeated.

Figure 5:
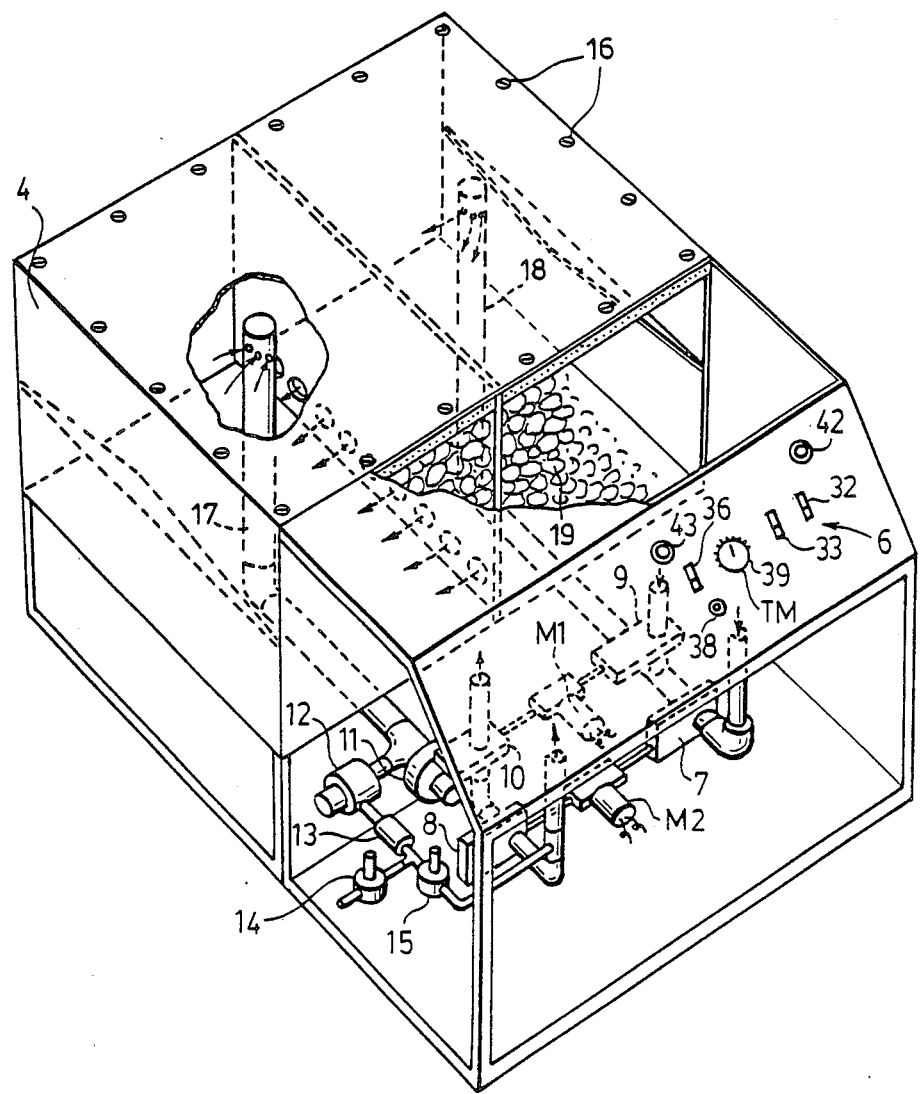
FIG. 5 is a perspective view of the physical arrangement of the system of FIG. 2.

Considering now FIG. 5, there is shown a convenient arrangement for various elements of the system excluding the food storage chamber and the de-oxidizer. The adsorber chamber 4 is mounted at the back of a suitable enclosure, the adsorber is filled nearly to the top with activated charcoal which is covered with a suitable porous membrane. The top of the chamber is secured to the chamber by means of a number of bolts 16 which enable the top cover to be conveniently removed. The inlet and outlet from the chamber are connected through standpipes 17 and 18 which pass through the charcoal 19 and extend up to the lid of the chamber and serve to support the lid. The pipes 17 and 18 extend to valves 7, 9, blower 11 and pump 12 respectively.

Suitable filters are provided on the intake side of the valve 9 which is connected to atmosphere and to the intake side of valve 7 which is connected to the food storage chamber to prevent solid material from passing into the adsorber chamber.

The automatic control system 6 is mounted on the front of the enclosure with suitable electrical switches to control the activation of the system with a timer which is arranged to provide the time sequence described in association with FIG. 4 and is connected electrically to the various valves and pumps in the manner shown in FIG. 3, which is a detached contact circuit diagram of control system 6.

As illustrated in FIG. 3, an electrical supply is applied to terminals 30 and 31 and through protective circuit breaker contacts 32 and 33 to transformer 34 which reduce the voltage applied to buss 35 through switch 36 and to buss 37. Lamp 38 indicates when the control system is energized.

A timer switch motor 39 drives two single pole double throw switches 1TM and 2TM having contacts 1TM1, 1TM2, 2TM1 and 2TM2 respectively. Modutrol motor 40 is connected through 2TD2 and 1TM1 to buss 35 and is mechanically connected to valves 9 and 10. Modutrol motor 41 is connected through 2TD1 and 2TM2 to buss 35 and is mechanically connected to valves 7 and 8. Indicator lamps 42 and 43 indicate which motor, 40 or 41, is energized and hence whether the system is on the scrub or regenerate cycle.

Time delay relay TD1 is connected through contact 1TM2 to buss 35. Time delay relay TD2 is connected through contact 2TM1 to buss 35.

Auxiliary switches M1 and M2 are mechanically connected to modutrol motors 40 and 41 respectively and are operated when the motors reach each end of their operation stroke. Contacts 1M2 close when valves 9 and 10 are fully open and contact 1M1 close when valves 7 and 8 are fully open. When either 1M1 or 1M2 is closed, contactor 44 is energized from buss 35 and closes contacts BL1 and BL2 energizing blower 11. Contacts 2M1 are normally closed when valves 7 and 8 are fully closed and contacts 2M2 are normally closed when valves 9 and 10 are fully closed. Contacts 1TD1 of time delay relay are normally closed and open one minute after TD1 is energized.

When contacts 1TM2 are first closed, a circuit is provided through 2M1, 1TD1 to relay VP1 closing contacts 1VP1 and energizing the vacuum pump 12. After one minute TD1 times out and the vacuum pump is de-energized. Solenoid S1 in parallel with VP1 operates valve 14 and opens this valve while the vacuum pump is operating.

When contacts 2TM1 are first closed, time delay relay TD2 is energized. Contacts 1TD2 are normally closed, 2M2 is closed when valves 9 and 10 are fully closed and relay VP2 is energized from buss 35 closing contacts 1VP2 energizing the vacuum pump 12. After one minute TD2 times out, contacts 1TD2 open, VP2 is de-energized, 1VP2 opened and the vacuum pump is de-energized. Solenoid S2 is in parallel with VP2 and opens valve 15 while the vacuum pump is operating.

With a time period as shown in FIG. 4, it was found that a suitable reduction of pressure in the adsorber could be obtained in about one minute. This reduction represents about ⅔ of an atmosphere. If FIG. 1B represents the pressure variations caused by completely transferring the volume of gas in the adsorber into the food storage chamber and the reduction of pressure during the second period due to leakage of the storage chamber then it will be evident that when the pressure in the adsorber is only reduced by ⅔ of an atmosphere, the system will be working further down on the curve shown in 1A. Indeed, if the pressure variation in FIG. 1B is 3 units then the pressure variation in 1C will be only 2 units. The resultant pressure variations within the food storage chamber therefore in the present system as compared to the prior art will be of the form shown in FIG. 1C. It is evident therefore that the total leakage into the storage chamber, assuming a constant chamber with the same leakage characteristics in both cases, will be less when operated in accordance with the present system. Since the leakage is less, the operation of the de-oxidizer can be reduced because all leakage into the storage system requires deoxidization to remove the oxygen leaked into the storage chamber.

A further advantage occurs when operating in accordance with the present system. It will be understood that the rate of adsorption in the adsorber is a function of the concentration of the gas $CO_2$ in the gas within the adsorber versus the concentration of the gas in the adsorbing agent. This relationship may be expressed substantially as follows: $da/dt\ f(c - nc_1)$ where c is the $CO_2$ concentration in the gas, $C_1$ is the $CO_2$ concentration in the adsorber material and n depends upon the adsorber material and is inversely proportional to temperature. Concentration of $CO_2$ in the gas in the adsorber is proportional to pressure assuming a constant ratio of $CO_2$ to nitrogen.

With the reduction of pressure in the adsorber during the first part of the cycle, the $CO_2$ concentration in the gas in the adsorber is reduced and adsorbed carbon dioxide will be desorbed from the activated charcoal and concentrated in the gas within the adsorber. Some of it naturally will be drawn out into the food storage area, but the majority will remain within the adsorber. Now when the ambient atmosphere from valve 9 is introduced into the adsorber it quickly flushes the concentrated carbon dioxide out of the adsorber and out into the atmosphere through valve 10. The reduction of pressure during the next part of the cycle when valve 9 is closed and pump 12 is operating will also cause a desorption of carbon dioxide from the adsorbing material, however, at this point the carbon dioxide has largely been flushed out of the system and will not cause undue concentration in the gas within the adsorber.

It therefore appears that the variations in pressure within the adsorber operate to improve its effectiveness and cause a greater quantity of carbon dioxide to be removed from the adsorber during the flushing process, however, the pressure variations within the food storage area, as has been previously indicated, are reduced and thus there is a reduced leakage of ambient atmosphere into the food storage area.

While described with reference to specific times and cycle ratios, it will be understood these must vary depending on many factors including:
Volume of the storage chamber;
Quantity of produce in the storage chamber;
Nature of the produce;
Volume of the adsorber;
Material in the adsorber;
Ambient temperatures, etc.

While the process has been described with operation of the vacuum pump before and after regeneration, it will be understood that the reduction of pressure in the adsorber may only occur at the end of the regeneration cycle.

We claim:

1. A process for removing undersiable gasses form mixed gasses in a storage chamber with minimal variation in pressure within the storage chamber comprising the following sequence of steps:
    (a) circulating the mixed gasses through an adsorber chamber to remove the undesirable gasses for a first period of time;
    (b) shutting off the adsorber chamber inlet from the storage chamber;
    (c) reducing the pressure in the adsorber chamber by expelling a portion of the gas in the adsorber chamber into the storage chamber;
    (d) shutting off the adsorber chamber outlet to the storage chamber;
    (e) opening the adsorber chamber inlet and outlet to the ambient atmosphere and flushing the adsorber chamber with air from the ambient atmosphere;
    (f) shutting off the adsorber chamber inlet from the ambient atmosphere and reducing the pressure in the adsorber chamber by expelling portion of the gas in the adsorber chamber to the ambient atmosphere;
    (g) shutting off the adsorber chamber outlet to the ambient atmosphere;

(h) opening the adsorber chamber inlet and outlet to the storage chamber and repeating the steps starting at step (a).

2. A storage atmosphere control system including an adsorber for removing undesired gasses from the storage atmosphere with minimal pressure variation in said storage atmosphere comprising:
   (a) a storage chamber containing said storage atmosphere;
   (b) an adsorber chamber having an inlet and outlet and containing an adsorbent material capable of adsorbing said undesired gasses;
   (c) a first valve for connecting said storage chamber to said adsorber chamber inlet;
   (d) a blower for circulating gas from said adsorber chamber;
   (e) a second valve for connecting the output of said blower to said storage chamber;
   (f) a third valve for connecting the output of said blower to ambient atmosphere;
   (g) a fourth valve for conneoting the inlet of said adsorber chamber to ambient atmosphere.
   (h) a vacuum pump for extracting gas from said adsorber chamber;
   (i) a fifth valve for connecting the output of said vacuum pump to ambient atmosphere;
   (j) a sixth valve for connecting the output of said vacuum pump to said storage chamber;
   (k) means to open said first and second valves and activate said blower for a first period of time;
   (l) means to close said first and second valves, de-activate said blower, open said sixth valve and activate said vacuum pump for a second period of time;
   (m) means to close said sixth valve, de-activate said vacuum pump, open said third and fourth valves and activate said blower for a third period of time;
   (n) means to close said third and fourth valves, de-activate said blower, open said fifth valve and activate said vacuum pump for a fourth period of time;
   (o) means to close said fifth valve, de-activate said vacuum pump and repeat the steps from step (k) above.

3. A system as claimed in claim 2 including a check valve between said vacuum pump and said fifth and sixth valves.

4. A system as claimed in claim 2 including a filter between ambient atmosphere and said fourth valve.

5. A system as claimed in claim 2 including a filter between said storage chamber and said first valve.

* * * * *